United States Patent Office 3,378,584
Patented Apr. 16, 1968

3,378,584
PROCESS FOR REDUCING THE CAKING
TENDENCY OF CRYSTALLINE UREA
Eugene G. Hollowell, St. Louis, Mo., assignor to W. R.
Grace & Co., New York, N.Y., a corporation of
Connecticut
No Drawing. Continuation-in-part of application Ser. No.
293,154, July 5, 1963. This application Jan. 26, 1967,
Ser. No. 611,813
10 Claims. (Cl. 260—555)

ABSTRACT OF THE DISCLOSURE

In abstract, this invention is directed to a process for reducing the caking tendency of crystalline urea by freeing the urea of particles retained on about an 8 mesh U.S. Standard screen and of particles passing about a 40 mesh U.S. Standard screen, adjusting the moisture content of the thus screened urea to about 0.3–0.8%, and bagging said urea, all as described hereafter.

---

This application is a continuation-in-part of copending application Ser. No. 293,154, filed July 5, 1963, now abandoned.

This application is in the field of urea caking.

Prior art methods of reducing the caking tendency of urea include: (a) treating urea with conditioning agents such as clay, mica, basic aluminum sulfate, basic magnesium carbonate, and the like; (b) treating urea with anticaking agents such as acetylene diurea, aromatic amines, long chain amines, and the like; (c) granulating urea; and (d) prilling urea. None of these methods have been entirely satisfactory because they are difficult to employ, or they introduce insoluble, toxic, or undesirable impurities into the urea or they only partially eliminate the caking problem.

In summary, this invention is directed to a process for reducing the caking tendency of unconditioned industrial grade crystalline urea comprising: (a) freeing said urea of particles retained on about an 8 mesh U.S. Standard screen; (b) freeing said urea of particles passing about a 40 mesh U.S. Standard screen; (c) adjusting the moisture content of the urea to about 0.3–0.8% by weight; and (d) bagging the thus treated urea.

In preferred embodiments of this invention the moisture content of the urea is adjusted to about: (a) 0.4–0.7% by weight; (b) 0.5–0.6% by weight; (c) 0.4–0.5% by weight; (d) 0.4–0.6%; (e) 0.6–0.8%; (f) 0.7–0.8%; or (g) 0.6–0.7% by weight before bagging said urea, said urea being freed of oversize particles (particles retained on about an 8 mesh or a 6 mesh U.S. Standard screen) and of undersize particles (particles passing about a 30 mesh or a 40 mesh U.S. Standard screen) before bagging.

Another embodiment of this invention is directed to a composition of matter consisting essentially of industrial grade crystalline urea, said urea passing about an 8 mesh U.S. Standard screen and retained on about a 40 mesh U.S. Standard screen, said urea containing about 0.3–0.8% moisture. Said composition was substantially noncaking and free-flowing. Where using this embodiment, I have obtained especially excellent results (i.e., the compositions were substantially noncaking and free-flowing) where the moisture content of the urea was about: (a) 0.4–0.7% by weight; (b) 0.5–0.6% by weight; (c) 0.4–0.5% by weight; (d) 0.4–0.6%; (e) 0.6–0.8%; (f) 0.7–0.8%; and (g) 0.6–0.7%. Said composition must be bagged, or otherwise protected from prolonged contact with air of such relative humidity that said air will withdraw, or remove, moisture from the composition because, if the moisture content of the composition is reduced below about 0.3%, the urea will cease to be substantially noncaking and free-flowing.

Crystalline urea is commercially available in a variety of forms, ranging from long needlelike crystals to rectangular or square-shaped crystals of relatively large size. In the usual plant operations, crystalline urea is dried to a low moisture content (less than 0.2% by weight) and packaged in multiply bags having moisture barriers such as polyethylene film plies or asphalt laminate plies; regardless of the particular shape and form of the crystals that are dried and packaged in this manner, it is always found that unconditioned industrial grade crystalline urea tends to set up into a single solid cake where bagged and stored in the ordinary manner for about a week or less. In some instances, particularly with the needlelike crystals, a hard solid cake is formed in a matter of hours when the bagged urea is subjected to very slight pressures, on the order of 1 to 5 pounds per square inch.

Although freshly prepared unconditioned industrial grade crystalline urea is generally free-flowing (i.e., consisting essentially of individual crystals, or small aggregates of several crystals, which if placed in a bottle, bag, or other container will readily flow from the container if it is opened and inverted) such urea, on standing in an open or closed container for a period of time (e.g., a day or two or up to about a week) will, as noted supra, set into a cake or cake-like mass which will remain in the container if the container is opened and inverted. In other words, the urea "cakes," or forms a cake, and ceases to be free-flowing. Such cakes generally become quite hard on standing for several days, and are difficult to break up into free-flowing particles.

I have found that unconditioned industrial grade crystalline urea can be rendered substantially noncaking (i.e., said urea will retain its free-flowing properties) by substantially freeing said urea of coarse particles (particles retained on about a 6 or 8 mesh U.S. Standard screen) and of fine particles (particles passing about a 30 or 40 mesh U.S. Standard screen), adjusting the moisture content of said urea to about 0.3–0.8% by weight, and bagging the thus treated urea. This is a surprising and unobvious finding because the prior art teaches that crystalline urea does not remain free-flowing except where thoroughly dry. (See Evans and Brook, Canadian Patents 648,545 and 648,549.) The term "thoroughly dry," as applied to crystalline urea by those skilled in the art, means that the urea has a moisture content of about 0.2% or less—generally and preferably less than about 0.1%.

Equally satisfactory results are obtained in the process of the instant invention whether the moisture content of unconditioned industrial grade crystalline urea is adjusted by: (a) drying wet crystals to the desired level; (b) adding water to overdried crystals; or (c) blending wet and overdried crystals in such ratio as to obtain the desired moisture level. Fine particles (e.g., those passing about a 30–40 mesh U.S. Standard screen) and oversize particles (e.g., those retained on about a 6–8 mesh U.S. Standard screen) can be removed before or after adjusting the moisture content of the crystalline urea.

I have found that the presence of about 0.3–0.8% by weight of moisture substantially reduces the caking tendency of unconditioned industrial grade urea that is substantially free of oversize and fine particles (i.e., particles retained on about a 6–8 mesh U.S. Standard screen) and fine particles (i.e., particles passing about a 30–40 mesh U.S. Standard screen); I have, as illustrated by Example 4, also made the surprising and unobvious finding that reducing the moisture content of such urea below about 0.3% by weight (e.g., to about 0.28% or less) increases the caking tendency of the urea.

Further, I have discovered that the presence of moisture in the range of about 0.3–0.8%, by weight, actually increases rather than decreases the caking tendency of unconditioned urea prills and unconditioned urea microprills. The reason for this unexpected and surprising anomaly in the behavior of different types of particulate urea is not understood.

By unconditioned crystalline urea is meant crystalline urea that has *not* been treated with a conditioning agent, and which has not been treated with an anticaking agent.

By unconditioned urea prills is meant urea prills which have not been treated with a conditioning agent and which have not been treated with an anticaking agent, and by unconditioned urea microprills is meant urea microprills that have not been treated with a conditioning agent and which have not been treated with an anticaking agent.

By industrial grade crystalline urea is meant crystalline urea suitable for industrial applications including the formation of urea-formaldehyde glues and resins. Such urea has a minimum total nitrogen content of about 46% by weight (reported as percent N), a maximum ash content (on burning) of about 30 parts per million by weight, a maximum iron content of about 1.5 parts per million by weight (reported as Fe), a maximum copper content of about 3 parts per million by weight (reported as Cu), a maximum free ammonia content of about 30 parts per million by weight (reported as $NH_3$), and a maximum oil content of about 20 parts per million by weight. The pH of a 10% aqueous solution of industrial grade crystalline urea is about 7–9.5 at about 20° C.—generally about 7.3–8.

I use the warehouse stack test to determine the caking tendency of urea because this stack test substantially approaches actual field storage conditions. In this test, the urea to be tested is bagged (ca., 100 lbs. of urea to the bag), and the test bags are placed horizontally on a wooden pallet of the type normally used for commercial warehouse storage of bagged urea. The same type of bag is employed as in routine commerical production of the product under test. The bag is filled to the same net product weight (ca. 100 lbs.), and the same bag closure that is used commercially is used in this test.

The test bags are arranged on the pallet in layers of four bags each, one bag along each side of the pallet. If there is an insufficient number of test bags to complete a layer on the pallet, additional bags of routine urea product are added as ballast. Six layers of bags are placed on the pallet.

The pallet of test material is then placed in warehouse storage, and weight is added by stacking two full pallets of commercially bagged product (6×4=24 bags/pallet) on top of the pallet of test material (i.e., the "test pallet"). The test pallet is stored in this condition for 28 days. At the end of the 28 days storage period, the bags are carefully removed from the pallet and each is dropped once from a height of about 2 feet to separate any loosely held agglomeration of particles that may have formed during storage. Each bag is opened at one end, and its content is poured onto a 2 mesh U.S. Standard screen which retains any lumps of caked material that may have formed. The lumps are retrieved and weighed. The weight, in pounds, of lumps retained on the 2 mesh U.S. Standard screen constitutes a quantitative measure of the urea's caking tendency and, hence, of said urea's free-flowing characteristics or the lack thereof.

It has been found that urea, including unconditioned industrial grade crystalline urea, is substantially free-flowing if, on being subjected to the warehouse stack test, described supra, 15 pounds or less of lumps (particles which fail to pass a 2 mesh U.S. Standard screen) are produced per 100 pounds of urea tested. If more than about 16–18 pounds of lumps are produced per 100 pounds of urea tested, the urea is not substantially free-flowing.

My invention is illustrated further by the following examples which are illustrative only and are not intended to limit the scope of the invention.

Example 1.—Control

A 100 lb. bag of unconditioned industrial grade crystalline urea from the plant production line was used in this test. Analysis showed that the material contained 0.05%, by weight, of moisture and that 53%, by weight, of said urea crystals passed through a 40 mesh U.S. Standard screen. This urea was submitted to the warehouse stack test. At the completion of the stack test all of the urea from the test bag was retained on a 2 mesh U.S. Standard screen—caking was 100% complete.

Example 2.—Control of particle size and moisture content

A quantity of unconditioned industrial grade crystalline urea from the same lot that was used in Example 1 was screened. Two fractions were collected, these were: (a) a fraction passing an 8 mesh U.S. Standard screen and retained on a 40 mesh U.S. Standard screen; and (b) a fraction passing a 40 mesh U.S. Standard screen. After adjusting the moisture contents of these fractions of screened urea to the levels indicated in the following table and bagging the thus treated urea, the bagged urea was subjected to the warehouse stack test. Results are presented below:

| Screen Fraction | Moisture Content, Percent by Weight | "Lumps," Pounds Per 100 Pound Bag [1] |
| --- | --- | --- |
| −8+40 [2] | 0.08 | 21 |
| −40 [3] | 0.04 | 100 |
| −40 [3] | 0.09 | 100 |

[1] The term "lumps" means material that failed to pass a 2 mesh U.S. Standard screen.
[2] Passed an 8 mesh U.S. Standard screen and retained on a 40 mesh U.S. Standard screen.
[3] Passed a 40 mesh U.S. Standard screen.

Example 3.—Control of particle size and moisture content

A 100 lb. bag of unconditioned industrial grade crystalline urea analyzing substantially 0.8% moisture by weight, passing an 8 mesh U.S. Standard screen, and retained on a 40 mesh U.S. Standard screen was subjected to the warehouse stack test. At the end of the stack test 10 lbs. of urea from this bag was retained on a 2 mesh U.S. Standard screen.

Example 4.—Effect of moisture on caking of −8, +40 mesh unconditioned industrial grade crystalline urea The general procedure of Example 3 was repeated using eleven 100 pound portions of urea. Each 100 pound portion was prepared by adjusting the moisture content of unconditioned industrial grade urea passing an 8 mesh U.S. Standard screen and retained on a 40 mesh U.S. Standard screen. After adjusting the moisture content of each portion, said portion was bagged in a conventional commercial (100 pound) urea bag and submitted to the above-described warehouse stack test. Results of these test are presented below:

| | Moisture Content, Percent by Weight | "Lumps," Pounds Per 100 Pound Bag [1] |
| --- | --- | --- |
| Portion No.: | | |
| 1 | 0.03 | 31 |
| 2 | 0.11 | 36 |
| 3 | 0.19 | 36 |
| 4 | 0.25 | 42 |
| 5 | 0.28 | 43 |
| 6 | 0.30 | 8 |
| 7 | 0.33 | 8 |
| 8 | 0.35 | 8 |
| 9 | 0.56 | 15 |
| 10 | 0.59 | 15 |
| 11 | 0.88 | 10 |

[1] The term "lumps" means material that failed to pass a 2 mesh U.S. Standard screen.

Example 5.—Attempt to reduce caking tendency of unconditioned urea microprills

After adjusting the moisture content of different portions of a lot of unconditioned urea microprills (ca. −8, +40 mesh, U.S. Standard, i.e., the microprills passed an 8 mesh U.S. Standard screen and were retained on a 40 mesh U.S. Standard screen) to the levels indicated in the following table and bagging the thus treated urea microprills, the bagged microprills were subjected to the warehouse stack test. Results are presented below:

| Moisture content, percent by weight: | "Lumps," pounds per 100 pound bag [1] |
|---|---|
| 0.23 | 49 |
| 0.39 | 66 |

[1] The term "lumps" means material that failed to pass a 2 mesh U.S. Standard screen.

As used herein, the term percent (%) means percent by weight.

What is claimed is:

1. A process for reducing the caking tendency of unconditioned industrial grade crystalline urea comprising:
   (a) freeing said urea of particles retained on about an 8 mesh U.S. Standard screen;
   (b) freeing said urea of particles passing about a 40 mesh, U.S. Standard screen;
   (c) adjusting the moisture content of said urea to about 0.3–0.8% by weight; and
   (d) bagging the thus treated crystalline urea.

2. The process of claim 1 in which the moisture content of the urea was adjusted to about 0.4–0.7% before bagging said urea.

3. The process of claim 1 in which the moisture content of the urea was adjusted to about 0.5–0.6% before bagging said urea.

4. The process of claim 1 in which the moisture content of the urea was adjusted to about 0.6–0.7% before bagging said urea.

5. A composition of matter consisting essentially of unconditioned industrial grade crystalline urea, said urea passing about an 8 mesh U.S. Standard screen and retained on about a 40 mesh U.S. Standard screen and containing about 0.3–0.8% moisture.

6. The composition of claim 5 in which the moisture content of the urea is about 0.4–0.7%.

7. The composition of claim 5 in which the moisture content of the urea is about 0.5–0.6%.

8. The composition of claim 5 in which the moisture content of the urea is about 0.4–0.5%.

9. The composition of claim 5 in which the moisture content of the urea is about 0.6–0.7%.

10. The process of claim 1 in which the moisture content of the urea was adjusted to about 0.4–0.5% before bagging said urea.

References Cited

Bland: Petroleum Processing, October 1952, pp. 1457–60 TP 690 AL, p. 38.

Ludwig: Chemical Engineering, January 1954, pp. 156–59, TN 1. MX5.

Silverberg et al.: Agricultural and Food Chemistry, vol. 6, No. 6 (June 1958), pp. 442–48, Tx 341.J5.

HENRY R. JILES, *Primary Examiner*.